No. 701,582. Patented June 3, 1902.
W. H. LAYNG.
TRUCK.
(Application filed Feb. 14, 1902.)
(No Model.) 2 Sheets—Sheet 1.

WITNESSES:
Geo. D. Richards
W. B. Fraentzel

INVENTOR:
WILLIAM H. LAYNG,
BY
Fred K. Fraentzel,
ATTORNEY

No. 701,582. Patented June 3, 1902.
W. H. LAYNG.
TRUCK.
(Application filed Feb. 14, 1902.)
(No Model.) 2 Sheets—Sheet 2.
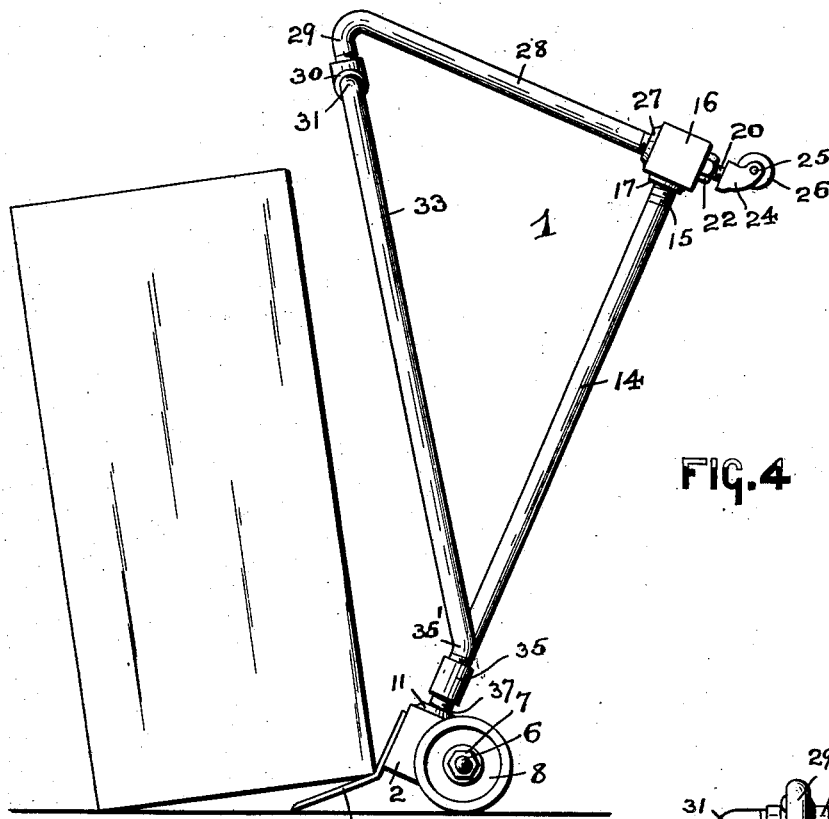
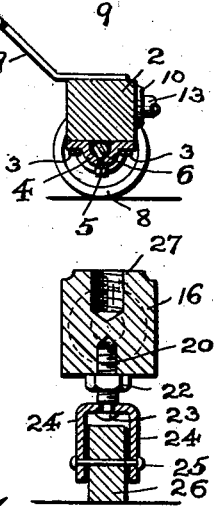
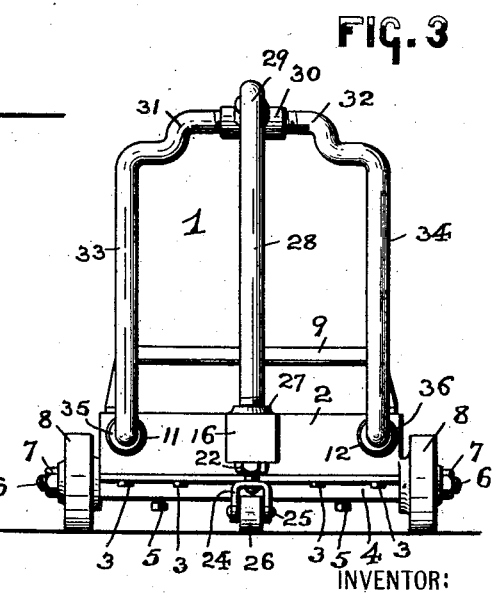
WITNESSES:
INVENTOR:
WILLIAM H. LAYNG,
BY
Fred'k C. Fraentzel,
ATTORNEY

UNITED STATES PATENT OFFICE.

WILLIAM H. LAYNG, OF NEWARK, NEW JERSEY.

TRUCK.

SPECIFICATION forming part of Letters Patent No. 701,582, dated June 3, 1902.

Application filed February 14, 1902. Serial No. 94,026. (No model.)

*To all whom it may concern:*

Be it known that I, WILLIAM H. LAYNG, a citizen of the United States, residing at Newark, in the county of Essex and State of New Jersey, have invented certain new and useful Improvements in Trucks; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The present invention has reference to a novel form and construction of truck for handling small or large packages with the greatest of ease, the invention having for its principal purpose to provide a simple construction of and cheaply-made truck which while supporting a load rests upon three wheels directly upon the floor, so as to remove all the weight of the load from the person handling the truck, and, furthermore, to facilitate the moving of very heavy loads, since all that a person manipulating the truck has to do is to push it along without helping to support a part of the weight, as in the ordinary constructions of hand-trucks.

A further object of this invention is to provide a three-wheeled truck of the character hereinafter more fully set forth, one of the wheels being provided with a swivel-pin, preferably made in the manner of the well-known construction of caster construction, whereby the truck can be turned in a small radius and is easily manipulated in a very small space.

With these several objects in view my invention consists in the novel construction of truck hereinafter set forth; and, furthermore, this invention consists in the various novel arrangements and combinations of the parts, as well as in the details of the construction thereof, all of which will be more fully described in the following specification and then finally embodied in the clauses of the claim which form a part of the said specification.

The invention is clearly illustrated in the accompanying drawings, in which—

Figure 1:
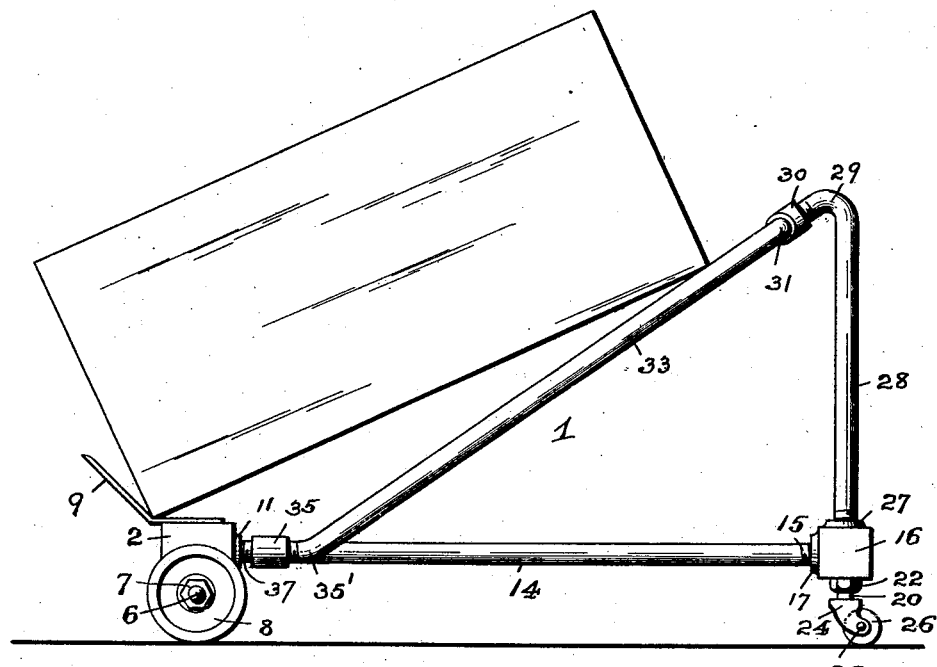
Figure 2:
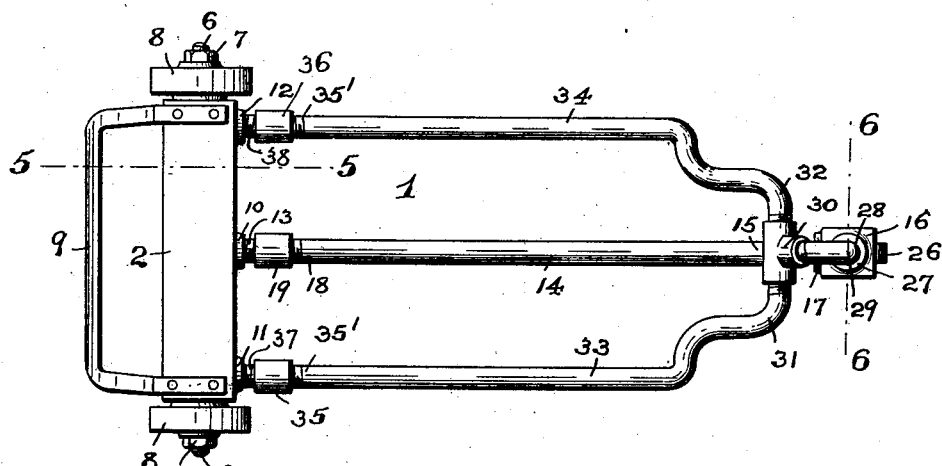

Figure 1 is a side elevation of a truck embodying the principles of my present invention, and Fig. 2 is a plan or top view of the same. Fig. 3 is a front elevation of the truck; and Fig. 4 is a side elevation of the truck, the same being represented in its loading or unloading position for placing or removing a package from the truss-like supporting-frame of the truck. Fig. 5 is a vertical cross-section taken on line 5 5 in Fig. 2 of the drawings; and Fig. 6 is a cross-section, on an enlarged scale, taken on line 6 6 in said Fig. 2.

Similar characters of reference are employed in all of the said above-described drawings to indicate corresponding parts.

In the said drawings the reference characters 1 indicates the complete truck, the same comprising in general a truss-like supporting-frame moving upon wheels or rollers and consisting, essentially, of a block or bar 2, to the bottom of which is secured, by means of bolts 3 or in any other suitable manner, a shaft or axle-receiving means, as 4, and which may be made in the manner of a plate, as indicated in Fig. 5 of the drawings. Immovably held in a fixed position against the under surface of the said bar or block 2 by means of screws or bolts 5 or in any other manner is a rod or axle 6, having its opposite and free ends extending beyond the edges of the said block or bar 2, as clearly illustrated in the drawings. Rotatively arranged upon the said free ends of this rod or axle 6 and suitably retained in their operative positions, preferably by means of nuts 7, as indicated, although any other retaining means may be employed, are truck wheels or rollers 8, all of which is clearly illustrated in the accompanying drawings. Suitably secured upon the upper surface of the said block or bar 2 is the usual form of heel or guard 9, which is employed for lifting a package upon the said block or bar 2 and for retaining the said package in its supported position upon the truss-like frame of the truck. The said block or bar 2 is usually provided with a set of receiving-sockets, as 10, 11, and 12. In the central socket 10 is secured a short piece of piping 13, and 14 indicates a longer pipe, which is secured at its forward end 15 to a receiving-socket 17 of a retaining block or fixture 16 and has its opposite end 18 connected with the pipe 13 by means of a union 19, the screw-threads upon the several pipes and in the union being made accordingly, so that the several parts may be properly connected. In a screw-threaded receiving-socket 20 of the said retaining block or fixture 16 is a screw stud or pin 21, provided with a lock-nut 22. Rotatively arranged upon the lower portion of the said stud or pin 21 and held in place by means of a suitable head 23 or other means is a yoke or frame 24, which is provided with a cross-pin 25, upon which is a wheel or roller 26, as clearly illustrated in Fig. 6 of the drawings. Thus it will be clearly evident from the previous description that the said block or bar 2, the said piping or members 13 and 14, and the retaining block or fixture 16 provide a suitable base for the truck, the same being supported so as to be movable along the floor by the pair of wheels or rollers 8 at the rear and the horizontally-rotatable wheel 26 at the front of the device. The said retaining block or fixture 16 is also provided with a screw-threaded socket 27 in its upper part, into which is screwed the lower end of an upwardly-extending standard or pipe 28, which is provided at the top with the curved and angularly-extending end portion 29. This portion 29 is connected to a T-fitting 30, to the respective and laterally-extending ends of which are secured the suitably-bent and curved end portions 31 and 32 of a pair of downwardly-extending and angularly-arranged supporting-frame pieces or pipes 33 and 34. Each piece or pipe 33 and 34 is made with a suitably-bent end portion 35 at its lower end, as shown in Figs. 1 and 4, the respective ends of the said pieces or pipes 33 and 34 being connected, by means of the sleeves or unions 35 and 36, with the short pieces or pipes 37 and 38, respectively secured in the sockets 11 and 12 of the said block or bar 2, as will be clearly understood from an inspection of the several figures of the drawings.

Of course it will be obvious that in lieu of making the various parts of the truss-like supporting-frame of the truck of tubular iron or pipes solid rods of any desirable cross-section may be substituted, if desired, and these rods or bars may be connected with the said block-bar and with the fixture 16 in any other manner from that shown in the accompanying drawings.

From an inspection of Figs. 1 and 4 of the drawings it will be seen that a supporting-frame of a triangular configuration when viewed from the side is produced, the block or bar 2 and the truss-shaped frame serving to readily support a package whether small or large or whether of a light or heavy weight, the package being easily placed upon the truck, as indicated in Fig. 4 of the drawings, and after the truck has again been placed in its movable position upon the floor is supported upon the framework of the truck to be moved from one place to another.

Owing to the arrangement of the several wheels or rollers of the truck the latter can be moved in any direction upon a small floor-space, and the entire weight of the package resting directly upon the truck-frame instead of being partly taken up by the operator, as is now the case in the present forms of trucks, the heaviest loads can be moved with the greatest of ease by exerting but a slight pulling or pushing force with but one hand upon the standard 28 of the truck, as will be clearly evident. Furthermore, the supporting-frame of the truck being made in the form of a truss great strength and stability of the parts of the truck for carrying the heaviest loads is the result.

I am fully aware that changes may be made in the various arrangements and combinations of the parts without departing from the scope of my present invention. Hence I do not limit my invention to the exact arrangements and combinations of the parts as described in the previous specification and as illustrated in the accompanying drawings of the device, nor do I confine myself to the exact details of the construction of any of the said parts.

Having thus described my invention, what I claim is—

1. A truck, comprising, a bar at one end, a pair of supporting-wheels connected with said bar, a retaining-fixture at the other end of said truck, a supporting-wheel connected with said fixture, and a truss-shaped supporting-frame for supporting a package, consisting, essentially, of a horizontal and centrally-arranged connecting-piece between said bar and said fixture, a standard on said fixture at right angles, or approximately so, to said central bar, and a pair of supporting-pieces between the upper portion of said standard and said bar, all arranged to form a right-angled triangle when viewed from the side and its hypotenuse forming a support for the package, substantially as and for the purposes set forth.

2. A truck, comprising, a bar at one end, a pair of supporting-wheels connected with said bar, a retaining-fixture at the other end of said truck, a swivel-frame connected with said fixture, a wheel journaled in said swivel-frame, and a truss-shaped frame for supporting a package, consisting, essentially, of a horizontal and centrally-arranged connecting-piece between said bar and said fixture, a standard on said fixture at right angles, or approximately so, to said central bar, and a pair of supporting-pieces between the upper portion of said standard and said bar, all arranged to form a right-angled triangle when viewed from the side and its hypotenuse forming a support for the package, substantially as and for the purposes set forth.

3. The herein-described truck, consisting, of a bar 2, a bearing means connected with said bar, an axle arranged in said bearing means and secured to said bar 2, receiving-sockets 10, 11 and 12 on said bar, a fixture 16, a receiving-socket 17 on said fixture, a connecting rod or piece between said sockets 10 and 17, a swivel-wheel connected with said fixture 16, a receiving-socket 27 on said fixture, a standard 28 in said socket 27, and connecting-pieces between said sockets 11 and 12 and the upper portion of said standard, to provide a supporting-frame for the support of a package, substantially as and for the purposes set forth.

4. The herein-described truck, consisting, of a bar 2, a bearing means connected with said bar, an axle arranged in said bearing means and secured to said bar 2, receiving-sockets 10, 11 and 12 on said bar, a fixture 16, a receiving-socket 17 on said fixture, a connecting rod or piece between said sockets 10 and 17, a swivel-wheel connected with said fixture 16, a receiving-socket 27 on said fixture, a standard 28 in said socket 27, a bent part 29 on the upper end of said standard, a T-fitting connected with said bent part 29, and angularly-connecting pieces 33 and 34 between the respective ends of said T-fitting and the said sockets 11 and 12, the whole forming a triangularly-shaped truss-frame for the support of a package, substantially as and for the purposes set forth.

In testimony that I claim the invention set forth above I have hereunto set my hand this 11th day of February, 1902.

WILLIAM H. LAYNG.

Witnesses:
FREDK. C. FRAENTZEL,
GEO. D. RICHARDS.